May 17, 1966 J. BERCHTOLD 3,251,936

ELECTRONIC SYSTEM FOR VIEWING NEGATIVE TRANSPARENCIES

Filed June 25, 1962

2 Sheets-Sheet 1

INVENTOR.
JEAN BERCHTOLD
BY Christie, Parker & Hale
ATTORNEYS.

INVENTOR.
JEAN BERCHTOLD
BY Christie, Parker & Hale
ATTORNEYS.

United States Patent Office 3,251,936

Patented May 17, 1966

3,251,936
ELECTRONIC SYSTEM FOR VIEWING NEGATIVE TRANSPARENCIES

Jean Berchtold, Pasadena, Calif., assignor, by mesne assignments, to Bell & Howell Company, Chicago, Ill., a corporation of Illinois

Filed June 25, 1962, Ser. No. 204,973
6 Claims. (Cl. 178—6.8)

Figure 1:
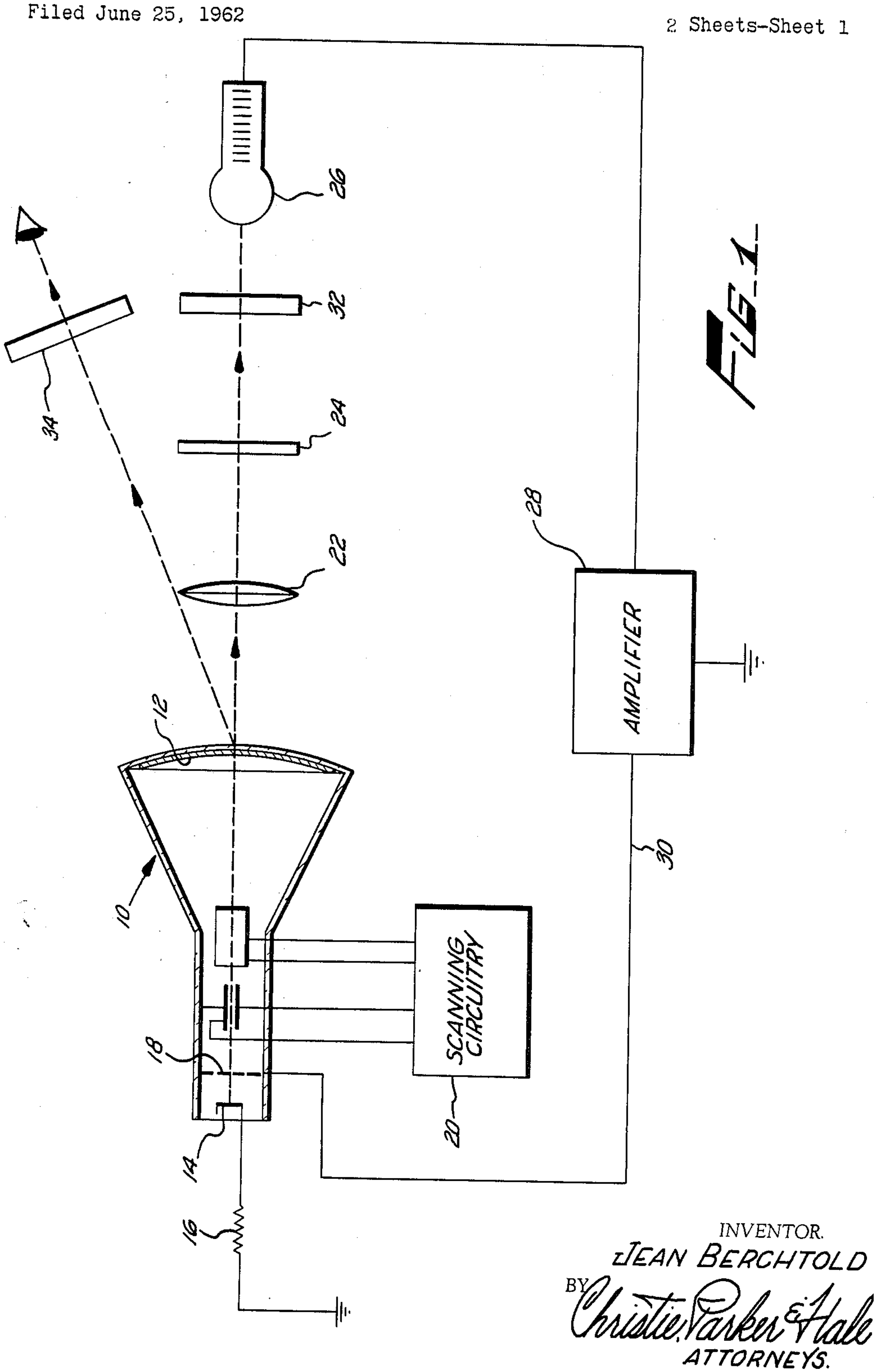

This invention is directed to improvements in systems for electronically previewing a positive image to be formed from a negative transparency and, more particularly, to an improved electronic viewer for displaying an electronic image which is a tone reversed version of a scanned object.

In many photographic processes, and particularly in processes involving the printing of high quality positive photographs from a negative transparency, it is desirable to be able to preview the positive print prior to the actual printing thereof.

A method commonly employed by larger photographic processing establishments to provide such a preview utilizes well known television display techniques and includes a TV scanning tube for scanning the negative transparency, a photo multiplier tube for developing a signal in response to light passing through the negative transparency, and a TV display tube for receiving the signal and displaying electronically a positive image of the negative transparency. To produce an accurate positive image from the transparency, however, the transmission and display characteristics of the scanning and display TV tubes must be closely controlled. Thus, not only is such a system quite expensive, but it also requires a skilled technician for accurate operation. For these reasons the conventional TV system for displaying positive images is generally unsuited for the use of individual photographers.

In an attempt to answer the needs of the individual photographer, a simplified and relatively inexpensive system for previewing positive images from a negative transparency has been devised. Briefly, the simplified system includes a cathode ray tube for scanning the negative transparency, a photomultiplier for producing an electrical signal in response to the light passing through the negative transparency, and a high gain amplifier for amplifying the electrical signal to develop a control voltage. The control voltage is applied to the cathode ray tube to control the intensity of the scanning beam produced thereby such that a given increment in the intensity of the light received by the photo tube produces an opposite increment in the intensity of the scanning beam. In this manner an electronic image is formed on the screen of the cathode ray tube which portrays the positive print which would actually be formed from the negative transparency by photographic processing.

As described, the simplified system encompasses a high gain negative feedback loop. Thus, in order to produce an image which accurately represents the positive print of the negative transparency it is mandatory that changes in the transparency of the negative, as by changes in the tone of the image thereon, produce an immediate and inverse change in the brightness of the corresponding picture element on the screen of the cathode ray tube. In this respect, it is necessary that the screen of the cathode ray tube have an extremely short persistence, otherwise light from a spot on the screen previously scanned will adversely effect or even completely mask the light at the spot presently being scanned and which is to be detected by the photo multiplier as it passes through the negative transparency. In such an instance, the magnitude of the control voltage produced by the amplifier will be completely inaccurate and an error will result in the portrayal of the positive image on the screen.

Generally, the screen of the cathode ray tube is formed of a layer of phosphor, that is, a composition of matter which emits light upon bombardment with electrons or with light of a different wavelength. In practice, it has been found that in order for the negative feedback system to operate accurately it is necessary that the phosphor possess a photo emission decay time of less than one microsecond to ten percent emission. All known phosphors possessing such a decay time emit light primarily in the blue and ultra-violet regions of the spectrum. Although this light quality is very favorable for scanning purposes and photo cells and tubes responsive to blue and ultra-violet light possess a high signal to noise ratio, the blue and ultra-violet colors, upon viewing, produce rapid fatigue to the eye and are of such a character that it is very difficult to judge tone rendition of the image on the screen. In addition, the very short persistence of the light emitted by such a phosphor tends to produce a sensation of flicker. Thus, in practice, it is extremely difficult to judge overall picture quality of the positive image produced by the simplified system. For this reason the simplified system has, to date, found little use as an electronic previewer for positive images.

In view of the above, the present invention provides an improved electronic viewer employing the simplified system and which develops a clear positive image from a negative transparency which is easy to judge for tone rendition and which is not subject to undesired flicker.

Briefly, to accomplish this, the present invention, in one form, utilizes a cathode ray tube having a screen formed of two phosphors. The first phosphor is a "blue" phosphor, that is, the phosphor possesses a decay time of less than one microsecond to ten percent of emission and preferably emits light in the blue and ultra-violet regions of the spectrum. Such a phosphor is thus ideally suited for scanning purposes in the feedback system. The second phosphor is a "white" phosphor, that is, the phosphor emits light having a peak wavelength in the range of 520 to 580 millimicrons, a broad distribution of spectral emission to provide a visual sensation of white, and a low emission of light in the blue and ultra-violet spectral regions. Preferably, the white phosphor also possesses an emission decay time of greater than one-hundredth of a second to ten percent of emission. The white phosphor may be either cathodoluminescent or photoluminescent or both. That is, it may be excited by electron bombardment and/or by the blue and ultra-violet radiation emitted by the blue phosphor. The white phosphor is thus ideally suited for clear and continuous viewing.

In one embodiment of the present invention the screen of the cathode ray tube includes a layer formed of a mixture of the two phosphors. The scanning electron beam formed in the cathode ray tube upon striking the screen of the tube, causes the blue phosphor to emit blue and ultra-violet light having a short decay time. The white phosphor emits light having a relatively long decay time. As the screen is scanned by the electron beam the light emitted by the phosphors produces a moving beam of light which scans the negative transparency.

In order for the feedback system to operate accurately and rapidly to change the brilliance of the scanning beam with changes in the transparency of the negative, means are included for developing an electrical signal at the photomultiplier tube which is only responsive to the light emitted by the blue phosphor. Thus, the negative feedback loop functions as described above in providing accurate control of the intensity of the scanning beam in accordance with the transparency of the negative.

The scanning beam thus controlled produces an emission of light by the white phosphor which, independent of the blue phosphor, provides a clear, flicker free, and accurate portrayal of the positive which would be produced from a negative transparency by photographic processing. In order to view only the image produced by the light emitted by the white phosphor, a filter is placed between the screen and the viewing position which passes white light and absorbs the blue and ultra-violet light emitted by the blue phosphor.

In this manner, by a mixture of blue and white phosphors, the negative feedback system operates accurately to control the intensity of a scanning beam in the cathode ray tube and produces a positive image on the screen of the tube which is a clear portrayal of the actual positive which would be produced from the negative transparency upon photographic processing.

In a preferred embodiment of the present invention, the screen of the cathode ray tube includes two layers of phosphor. The inner layer is formed of blue phosphor while the outer layer is formed of white phosphor. The electron beam is directed at the inner layer and upon striking the inner layer produces an emission of light by the blue phosphor. The emission of light by the blue phosphor excites the white phosphor forming the outer layer. The white phosphor then emits light which may be viewed directly on the face of the cathode ray tube.

The light emitted by the inner layer is also directed through an optically flat side of the cathode ray tube and through a negative transparency. The light passing through the negative transparency is detected by a photomultiplier and the signal produced thereby applied to a high gain amplifier forming a part of the negative feedback loop to the cathode ray tube.

In this manner, and without requiring the use of filters and the like for filtering out undesired components of light produced by the cathode ray tube, the preferred embodiment of the present invention provides a negative feedback loop which is excited by blue and ultra-violet light emitted by the inner layer of the phosphor in the cathode ray tube and which produces at its outer layer a positive image of the negative transparency which is a clear, flicker free, and accurate portrayal of the actual positive print which would be produced from the negative transparency upon photographic processing.

Figure 2:
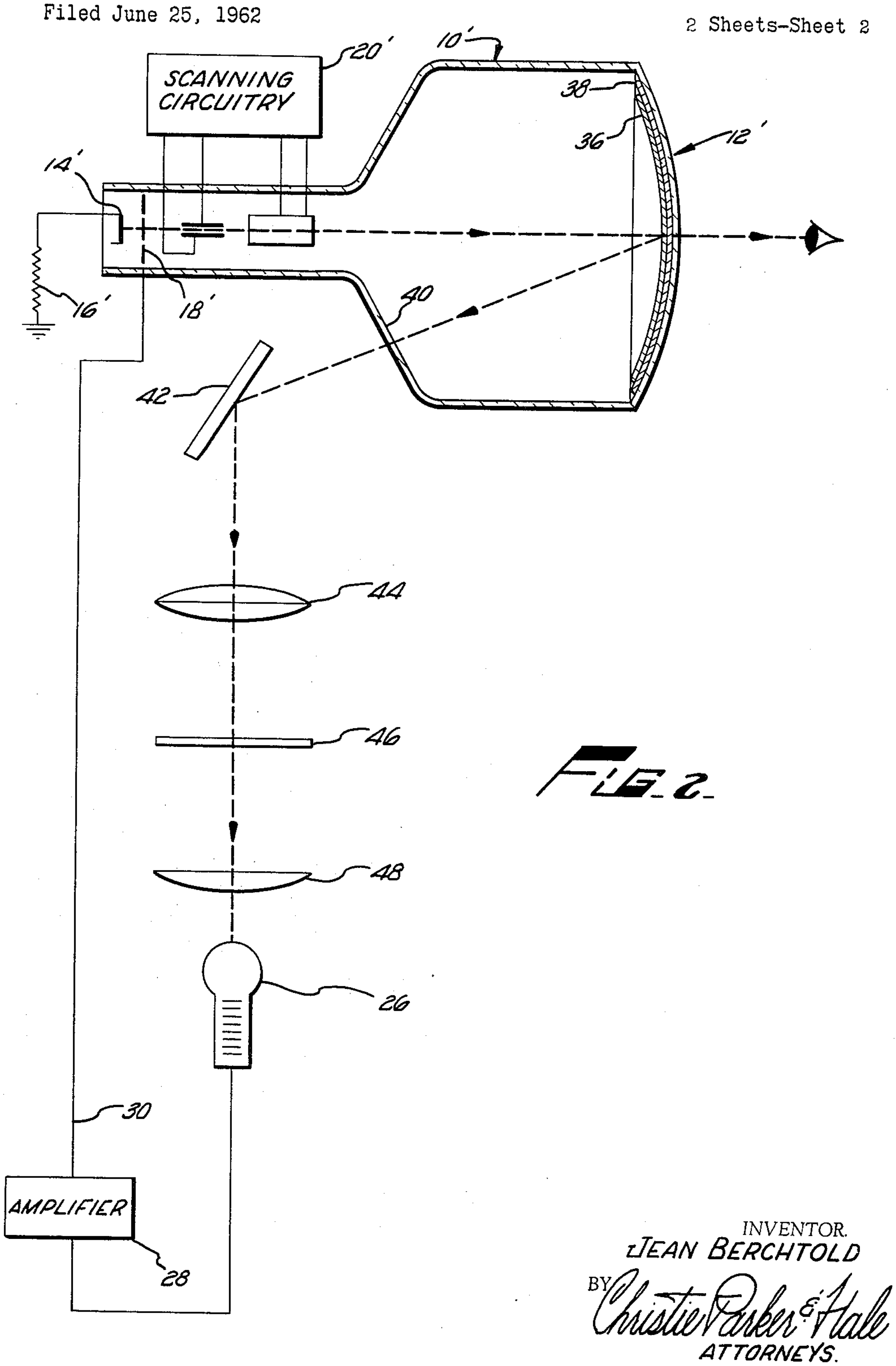

The above, as well as other features of the present invention, may be more clearly understood by reference to the following detailed description when considered with the drawings in which:

FIGURE 1 is a schematic, block diagram representation of one embodiment of the present invention; and FIGURE 2 is a schematic, block diagram of the preferred embodiment of the present invention.

As described briefly above, the present invention comprises a closed loop, negative feedback system in which the intensity of a scanning light beam is controlled to produce a clear tone-reversed image of an object scanned by the light beam. To provide a picture which is clear and free from flicker as well as a light beam which is adaptable for use in the feedback system, the screen of the cathode ray tube is formed of two phosphors, namely a blue phosphor and a white phosphor.

The blue phosphor is a phosphor having an emission decay time of less than one microsecond to ten percent of emission and preferably a phosphor having a primary emission in the blue and ultra-violet regions of the spectrum. Due to the extremely short decay time of the blue phosphor as well as its primary emission in the blue and ultra-violet spectral regions, it is ideally suited, and is in fact necessary, for scanning purposes in the feedback system. The phosphor best meeting these requirements is calcium-magnesium silicate activated with cerium, commonly designated P16. P16 possesses a decay time of one-tenth of a microsecond and a peak emission at a wavelength of 380 millimicrons.

The white phosphor is a phosphor which emits light having a peak wavelength in the range of 520 to 580 millimicrons, a broad distribution of spectral emission to produce a visual sensation of white, and a low emission in the blue and ultra-violet spectral regions. Preferably, the white phosphor also possesses an emission decay time of greater than $\frac{1}{100}$ of a second to ten percent emission. The emission of the white phosphor has been found to be most pleasing to the human eye and due to its relatively long decay time is preferable for flicker-free image display purposes. Several phosphors have been found which qualify as white phosphor. For example, combinations of zinc sulfide and cadmium sulfide activated with silver, zinc beryllium silicate activated with manganese, and zinc orthosilicate activated with manganese (willemite) each satisfy the above requirements. Of the group, the latter, in addition to exhibiting a cathodoluminescence, also possesses a high phosphorescence efficiency for converting ultra-violet radiations to visible light and is for this reason ideally suited for use as the outer layer of phosphor in the preferred embodiment of the present invention.

In the embodiment of the present invention illustrated in FIGURE 1, a cathode ray tube 10 is employed having a screen 12 including a layer of a mixture of blue and white phosphors. The cathode ray tube 10 includes a cathode electrode 14, coupled to ground through a resistor 16, for emitting electrons. The number of electrons emitted by the cathode 14 is controlled by the potential at a control grid 18. The electrons are deflected and focused in a beam by conventional means including a plurality of plates and scanning circuitry 20 to strike the screen 12 and scan a substantially rectangular raster thereon. Electrons, in striking the screen, cause the phosphor to emit a moving spot of light having wavelengths in the spectral regions of the respective phosphors. The moving spot of light defines a scanning light beam. The intensity of the light beam is controlled by the number of electrons striking a given spot on a screen and hence is controlled by the magnitude of the voltage applied to the control grid 18 of the cathode ray tube 10.

The scanning light beam is concentrated by a lens 22 and scans an object, such as a negative transparency 24. The light passing through the negative 24 is detected by a photomultiplier tube 26. The photomultiplier tube produces an electrical signal which is a function of the amount of light received thereby and passing through the negative 24. Thus, for a given incremental change in the transparency of the negative 24, as by a change in the tone of an image on the negative, a like incremental change occurs in the electrical signal produced by the photomultiplier tube.

The electrical signal developed by the photomultiplier tube is amplified by a high gain amplifier 28 to develop a control voltage signal at an output lead 30 which is applied to the control grid 18 of the cathode ray tube 10. Preferably, the amplifier 28 is a broad band video amplifier having a low distortion characteristic. The control voltage developed by the amplifier 28 is such that when applied to the control grid 18 a given incremental change in the intensity of the light received by the photomultiplier tube 26 produces an opposite incremental change in the number of electrons striking the screen 12 and hence an opposite change in brilliance of the light beam produced by the cathode ray tube.

In this manner the photomultiplier tube 26 and the high gain amplifier 28 define component elements in a negative feedback loop to the cathode ray tube 10 for controlling the brilliance of the light beam produced by the cathode ray tube in response to changes in the transparency of the negative 24 as it is scanned by the light beam. Due to such control of the brilliance of the light beam in the cathode ray tube 10, an image is formed on the screen 12 which is a tone reversed version of the object scanned by the light beam. Thus, in this case, as illustrated in FIGURE 1, wherein the object is a negative transparency, the image formed on the screen 12 portrays a positive image of the actual positive print which would be formed from the negative transparency by photographic processing.

Due to the mixture of phosphors composing the layer of the screen 12, the image portrayed on the face of the screen 12 is composed of light having wavelengths which lie in the spectral regions of the blue and white phosphors. As previously described, it is essential to accurate operation of the overall negative feedback system that the light beam utilized in the negative feedback loop have a rapid decay time. In the present invention, the light emitted by the blue phosphor is utilized to provide the light path forming a part of the closed negative feedback loop. In order to limit the light in the feedback loop to that emitted by the blue phosphor of the screen 12 it is necessary either to employ a photomultiplier tube which is primarily sensitive to emission in the blue and ultra-violet spectral regions, such as the well known photo multiplier 1 P21 manufactured by the Radio Corporation of America, and/or to employ a filter 32 between the screen 12 and the photomultiplier 26. The filter 32 is characterized by passing blue and ultra-violet light while absorbing the light emitted by the white phosphor of the screen 12. Such a filter is the Kodak Wratten 39 filter.

By employing either a photomultiplier tube sensitive only to blue and ultra-violet light or a filter for passing only blue and ultra-violet light, the light entering into the closed feedback loop is limited to the light emitted by the blue phosphor of the screen 12. Since the light emitted by the blue phosphor has an extremely short decay time, changes in the transparency of the negative 24 effect an immediate and accurate change in the brilliance of the light beam produced by the cathode ray tube 10. Hence, the image formed on the screen 12 of the cathode ray tube 10 as the electron beam scans a rectangular raster thereon is an accurate portrayal of the positive print of the negative transparency 24.

The image formed on the screen of the cathode ray tube is composed, in part, from light emitted by the white phosphor. Although, because of its relatively long decay time this light is unsuited to use in the actual feedback system it is, however, ideally suited for viewing purposes. The image formed from the white phosphor is, by itself clear, flicker free, and easy to judge for tone rendition. Thus, in the persent invention the picture viewed by an observer is that produced by the light emitted by the white phosphor of the screen 12. In order to only view the image produced by the white phosphor, a filter 34 is placed between the viewer and the screen 12. The filter 34 is characterized by passing the light emitted by the white phosphor and absorbing the light emitted by the blue phosphor. Accordingly, the image viewed through the filter 34 is a clear, flicker free, tone reversed representation of the negative 24 and accurately portrays the positive print which would be produced from the negative by photographic processing.

In the preferred embodiment of the present invention, as represented in FIGURE 2, the screen 12′ of the cathode ray tube 10′ includes two layers of phosphor. An inner layer 36 is composed of the blue phosphor while the outer layer 38 is composed of the white phosphor.

In the cathode ray tube 10′ electrons emitted at the cathode 14′ are deflected and concentrated into a beam which scans a raster on the inner layer 36 of the screen 12′. The electron beam, in striking the inner layer 36, causes the blue phosphor to admit a beam of light which radiates to the outer layer 38. The radiation from the inner layer 36 causes the white phosphor in the outer layer 38 to emit light in the form of a scanning beam which may be viewed by a viewer external to the cathode ray tube 10′.

The cathode ray tube 10′ includes an optically flat side wall portion 40 displaced from the path of the electron beam. The light beam formed by the inner layer of phosphor 36 passes through the optically flat side wall 40 and is reflected by a mirror 42 through a lens 44 to scan a negative transparency 46. The light passing through the transparency 46 is gathered by a condenser lens 48 onto the photomultiplier tube 26. The photomultiplier tube 26 is coupled to the high gain amplifier 28 and hence to the control electrode 18′ of the cathode ray tube 10′ as described in detail in connection with FIGURE 1. Since the light emitted by the inner layer 36 possesses an extremely short decay time and is primarily in the blue and ultra-violet regions of the spectral, no filters need be imposed between the cathode ray tube and the photomultiplier tube 26. The light beam scanning the negative 46 and produced by the inner layer 36 may therefore be directly utilized as part of the closed feedback loop for control of the brilliance of the light beam as described previously. Thus, an incremental change in the transparency of the negative 46 produces an opposite incremental change in the brilliance of the light beam formed by the inner layer 36 and also the outer layer 38 of the screen 12′.

Since the outer layer 8 is formed of the white phosphor, a viewer, in directly viewing the screen 12′ external to the cathode ray tube 10′, observes an image which is clear, flicker free, and which accurately portrays a tone reversed version of the object being scanned by the light beam formed by the inner layer 36 of the cathode ray tube 10′.

Although the present invention has been described in detail as scanning a negative transparency, it is to be understood that the negative transparency forms but one member of a class of objects which may be scanned by the light emitted by the blue phosphor of the screen of the cathode ray tube. The object may be solid and light reflected therefrom detected by the photomultiplier, or a positive transparency, in which case a negative image would be formed on the screen of the cathode ray tube.

What is claimed is:

1. An electronic viewer comprising:

scanning means including a screen having a layer including a mixture of white phosphor and a phosphor having an emission decay time of less than one microsecond to ten percent emission and means for producing a beam of electrons for scanning the screen to produce a scanning light beam and a visible image, the intensity of the electron beam being dependent upon a single control voltage supplied to the scanning means;

an object positioned to receive the scanning beam of light emitted by the screen;

a high gain negative feedback loop including a photosensitive element for producing an electrical signal in response to the light in the light beam which is emitted by the phosphor having an emission decay time of less than one microsecond and received from the object, and high gain amplifying means for amplifying the electrical signal produced by the photosensitive element to develop the control signal for controlling the intensity of the electron beam such that a given increment in the intensity of the light from the object produces an opposite increment in the intensity of the electron beam, whereby the visible image formed on the screen is a tone reversed version of the object;

and a filter for passing light emitted by the white phosphor and absorbing light emitted by the phosphor having an emission decay time of less than one microsecond, the filter being positioned along a viewing path of an observer.

2. The apparatus defined in claim 1 including a second filter for passing light emitted by the phosphor having a decay time of less than one microsecond and absorbing light emitted by the white phosphor, the second filter being positioned between the object and the photosensitive element.

3. An electronic viewer comprising:

a cathode ray tube including a screen having a layer formed of a mixture of white phosphor and a phosphor having an emission decay time of less than one microsecond to ten percent emission and means for producing a beam of electrons for scanning the screen to produce a scanning beam of light and a visible image, the intensity of the electron beam being dependent upon a control voltage applied to the cathode ray tube;

a transparency positioned to receive the light beam emitted by the screen of the cathode ray tube;

a high gain negative feedback loop including a photomultiplier tube for developing an electrical signal in response to light emitted by the phosphor having an emission decay time of less than one microsecond and passing through the transparency and high gain amplifying means for amplifying the signal produced by the photomultiplier to develop the control signal for controlling the intensity of the electron beam such that a given increment in the intensity of light received by the photomultiplier tube produces an opposite increment in the intensity of the light beam whereby the visible image formed on the screen of the cathode ray tube is a tone reversed version of the transparency;

and means positioned along the viewing path for filtering out light emitted by the phosphor having an emission decay time of less than one microsecond to ten percent emission.

4. An electronic viewer comprising:

a cathode ray tube including a screen having an inner layer of phosphor having an emission decay time of less than one microsecond to ten percent emission and an outer layer of white phosphor and means for producing a beam of electrons for scanning the inner layer of phosphor to produce a scanning beam of light, the intensity of the light beam being dependent upon a control voltage supplied to the cathode ray tube, the cathode ray tube further having an optically flat side displaced from the path of the electron beam for passing the light beam emitted by the inner layer of phosphor;

an object;

a mirror for reflecting light passing through the side of the cathode ray tube to the object;

and a high gain negative feedback loop including a photosensitive element for developing an electrical signal in response to light received from the object and high gain amplifying means for amplifying the electrical signal produced by the photosensitive element to develop the control signal for controlling the intensity of the light beam in the cathode ray tube such that a given increment in the intensity of the light from the object produces an opposite increment in the intensity of the light beam whereby an electronic image is formed on the outer layer of the screen which is tone reversed version of the object.

5. The apparatus defined in claim 4 wherein the object is a transparency and the photosensitive element is positioned to receive light passing through the transparency.

6. An electronic viewer comprising:

scanning means including a screen having an inner layer of a cathodoluminescent phosphor having an emission decay time of less than one microsecond to ten percent emission and an outer layer of a photoluminescent phosphor having an emission decay time greater than one-one hundredth of a second to ten percent emission and means for producing a beam of electrons for scanning the inner layer of phosphor to produce a beam of light for exciting the outer layer of phosphor and producing a scanning light beam, the intensity of the electron beam being dependent upon a control signal supplied to the scanning means, an object positioned to receive the scanning light beam emitted by the screen, and a high-gain negative feedback loop including a photosensitive element for developing an electrical signal in response to light directed through the object and high gain amplifying means for amplifying the electrical signal produced by the photosensitive element to develop the control signal for controlling the intensity of the electron beam such that a given increment in the intensity of the light from the object produces an opposite increment in the intensity of the electron beam whereby the visible image formed on the outer layer of phosphor is a tone reversed version of the object.

References Cited by the Examiner

UNITED STATES PATENTS

| | | | |
|---|---|---|---|
| 2,214,072 | 9/1940 | Biedermann | 178—6.8 |
| 2,480,425 | 8/1949 | Simmon | 178—6.8 |
| 2,520,507 | 8/1950 | Marcy | 178—6.8 |

DAVID G. REDINBAUGH, *Primary Examiner.*